United States Patent
Carro et al.

(10) Patent No.: US 10,628,157 B2
(45) Date of Patent: Apr. 21, 2020

(54) EARLY PREDICATE LOOK-UP

(71) Applicant: ARM Limited, Cambridge (GB)

(72) Inventors: Alejandro Rico Carro, Austin, TX (US); Lee Evan Eisen, Round Rock, TX (US)

(73) Assignee: ARM Limited, Cambridge (GB)

( * ) Notice: Subject to any disclaimer, the term of this patent is extended or adjusted under 35 U.S.C. 154(b) by 76 days.

(21) Appl. No.: 15/493,492

(22) Filed: Apr. 21, 2017

(65) Prior Publication Data

US 2018/0307491 A1 Oct. 25, 2018

(51) Int. Cl.
*G06F 9/30* (2018.01)
*G06F 9/38* (2018.01)

(52) U.S. Cl.
CPC ........ *G06F 9/30036* (2013.01); *G06F 9/3013* (2013.01); *G06F 9/30018* (2013.01); *G06F 9/30072* (2013.01); *G06F 9/382* (2013.01); *G06F 9/3836* (2013.01); *G06F 9/3887* (2013.01)

(58) Field of Classification Search
CPC ... G06F 9/38; G06F 9/30; G06F 9/384; G06F 9/30036; G06F 9/3836; G06F 9/30003
See application file for complete search history.

(56) References Cited

U.S. PATENT DOCUMENTS

| | | | | |
|---|---|---|---|---|
| 7,114,059 B2* | 9/2006 | Wilkerson | .......... | G06F 9/30072 712/217 |
| 7,228,402 B2* | 6/2007 | Rychlik | .............. | G06F 9/30072 712/217 |
| 7,734,897 B2* | 6/2010 | Mansell | ................ | G06F 9/3822 712/225 |
| 2004/0205326 A1* | 10/2004 | Sindagi | ............... | G06F 9/30072 712/226 |
| 2006/0242391 A1* | 10/2006 | Elwood | ............... | G06F 9/30149 712/238 |
| 2008/0016320 A1* | 1/2008 | Menon | ................ | G06F 9/30014 712/22 |
| 2012/0124346 A1* | 5/2012 | Hardage | ............. | G06F 9/30072 712/239 |
| 2013/0080740 A1* | 3/2013 | Gentle | ...................... | G06F 7/00 712/205 |
| 2013/0151822 A1* | 6/2013 | Eichenberger | ...... | G06F 9/30018 712/234 |
| 2014/0115302 A1* | 4/2014 | Higham | .............. | G06F 9/30072 712/220 |

(Continued)

*Primary Examiner* — Michael J Metzger
(74) *Attorney, Agent, or Firm* — Nixon & Vanderhye, P.C.

(57) ABSTRACT

A processing pipeline has at least one front end stage for issuing micro-operations for execution in response to program instructions, and an execute stage for performing data processing in response to the micro-operations. At least one predicate register stores at least one predicate value. In response to a predicated vector instruction for triggering execution of two or more lanes of processing, the at least one front end stage issues at least one micro-operation to control the execute stage to mask an effect of a lane of processing indicated as disabled by a target predicate value. One of the front end stages may perform an early predicate lookup of the target predicate value to vary in dependence on the early predicate lookup, which micro-operations are issued to the execute store for a predicated vector instruction.

19 Claims, 7 Drawing Sheets

(56) References Cited

U.S. PATENT DOCUMENTS

| | | | |
|---|---|---|---|
| 2014/0289495 A1* | 9/2014 | Gonion | G06F 9/30036 712/7 |
| 2015/0019835 A1* | 1/2015 | Anderson | G06F 9/30036 712/3 |
| 2015/0089190 A1* | 3/2015 | Gonion | G06F 9/30036 712/7 |
| 2015/0089191 A1* | 3/2015 | Gonion | G06F 9/30036 712/7 |
| 2015/0227367 A1* | 8/2015 | Eyole-Monono | G06F 9/30036 712/7 |
| 2015/0254077 A1* | 9/2015 | Boettcher | G06F 9/30036 712/4 |
| 2015/0339122 A1* | 11/2015 | Chehaibar | G06F 9/30181 712/226 |
| 2016/0092217 A1* | 3/2016 | Gonion | G06F 9/30021 712/220 |
| 2016/0179538 A1* | 6/2016 | Collins | G06F 9/30134 712/202 |

\* cited by examiner

```
receive predicated vector instruction       ⎤─60
at predetermined front end stage
           ↓
perform early predicate lookup              ⎤─62
           ↓
vary μops issued to execute stage in        ⎤─64
dependence on early predicate lookup
```

FIG. 3

|      | H all 0? | L all 0? |
|------|----------|----------|
| P0   | 1        | 1        |
| P1   | 1        | 0        |
| P2   | 0        | 0        |
| ⋮    | ⋮        | ⋮        |
| P15  | 1        | 1        |

| V | PR | all 0? (70) | pending write count? (56) | LRU info (58) (72) |
|---|----|----|----|----|
| 1 | 1  | 1  |    |    |
| 1 | 7  | 1  |    |    |
| 0 | -  | -  | -  |    |
| 1 | 15 | 0  |    |    |

|  | 8b all 0? 56 | 16b all 0? 56 | 32b all 0? 56 | 64b all 0? 56 | pending write count 58 |
|---|---|---|---|---|---|
| P0 | | | | | |
| P1 | | | | | |
| P2 | | | | | |
| ⋮ | | | | | |
| P15 | | | | | |

EARLY PREDICATE LOOK-UP

BACKGROUND

Technical Field

The present technique relates to the field of data processing.

Technical Background

A processing pipeline may support vector instructions for triggering execution of two or more lanes of processing. In response to the vector instruction, at least one micro-operation corresponding to the predicated vector instruction is issued to an execute stage, to control the execute stage to execute each of the required lanes of processing. Some implementations may issue separate micro-operations for each lane, while others could issue a combined micro-operation which triggers multiple lanes of processing. By triggering multiple lanes of processing in response to one instruction, this can improve performance and reduce code size. Some vector instructions may be predicated, so that masking of an effect of a given lane of processing is controlled based on a predicate register storing a predicate value. Predication can be used for controlling conditional execution of operations in each lane, or for controlling loop unrolling, for example.

SUMMARY

At least some examples provide an apparatus comprising:

a processing pipeline comprising at least one front end stage responsive to program instructions to issue micro-operations for execution, and an execute stage to perform data processing in response to the micro-operations issued by said at least one front end stage; and at least one predicate register to store at least one predicate value;

wherein in response to a predicated vector instruction for triggering execution of a plurality of lanes of processing, said at least one front end stage is configured to issue at least one micro-operation corresponding to said predicated vector instruction and to control the execute stage to mask an effect of a lane of processing indicated as disabled by a target predicate value stored in one of said at least one predicate register; and said at least one front end stage comprises a predetermined front end stage to perform an early predicate lookup of the target predicate value, and to vary, in dependence on the early predicate lookup, which micro-operations are issued to the execute stage in response to said predicated vector instruction.

At least some examples provide an apparatus comprising:

means for data processing comprising at least one front end stage means for issuing micro-operations for execution in response to program instructions, and execute stage means for performing data processing in response to the micro-operations issued by said at least one front end stage means; and at least one means for storing at least one predicate value;

wherein in response to a predicated vector instruction for triggering execution of a plurality of lanes of processing, said at least one front end stage means is configured to issue at least one micro-operation corresponding to said predicated vector instruction and to control the execute stage means to mask an effect of a lane of processing indicated as disabled by a target predicate value stored in one of said at least one means for storing; and said at least one front end stage means comprises a predetermined front end stage means to perform an early predicate lookup of the target predicate value, and to vary, in dependence on the early predicate lookup, which micro-operations are issued to the execute stage means in response to said predicated vector instruction.

At least some examples provide a method for an apparatus comprising a processing pipeline comprising at least one front end stage responsive to program instructions to issue micro-operations for execution, and an execute stage to perform data processing in response to the micro-operations issued by said at least one front end stage; the method comprising:

receiving at said at least one front end stage a predicated vector instruction for triggering execution of a plurality of lanes of processing, where an effect of a lane of processing indicated as disabled by a target predicate value is to be masked;

performing an early predicate lookup of the target predicate value at a predetermined front end stage of said at least one front end stage; and varying, in dependence on the early predicate lookup, which micro-operations are issued to the execute stage in response to said predicated vector instruction.

Further aspects, features and advantages of the present technique will be apparent from the following description of examples, which is to be read in conjunction with the accompanying drawings.

DESCRIPTION OF EXAMPLES

A processing pipeline may include at least one front end stage which receives program instructions to be executed, and in response to the program instructions, issues micro-operations for execution by an execute stage of the pipeline. An execute stage performs data processing in response to the micro-operations. In some implementations, the micro-operations sent to the execute stage may be identical to the program instructions received at the front end stage, so that there may be a one-to-one mapping between program instructions and micro-operations. However, some pipelines may support more complex program instructions which may be decomposed into multiple micro-operations. For example, a load multiple program instruction triggering loading of data values from two or more addresses into respective registers may be split into individual load micro-operations which each perform a load from one of the addresses. In another example, a vector instruction could be decomposed into multiple micro-operations corresponding to different lanes of processing. Hence, the term "instruction" is used to refer to an instruction as encountered by the at least one front end stage, and the term "micro-operation" is used to refer to an instruction in the form in which it is issued to the execute stage, and there may be a one-to-one or one-to-many mapping between instructions and micro-operations.

The pipeline may support a predicated vector instruction for triggering execution of two or more lanes of processing. In response to the predicated vector instruction, the at least one front end stage may issue at least one micro-operation corresponding to the predicated vector instruction to the execute stage. In some implementations, the execute stage may receive a single micro-operation which triggers more than one lane of processing. It is also possible for separate micro-operations to be issued for each lane in response to the predicated vector instruction. The respective micro-operations may be executed in parallel or sequentially by the hardware of the execute stage, depending on the particular micro-architectural implementation. Separating the predicated vector instruction into separate micro-operations for each lane can for example help improve performance so that an operation in one lane is not unnecessarily held back while waiting for an input operand for another lane to become available.

For a predicated vector instruction, the at least one front end stage may control the execute stage to mask an effect of a lane of processing indicated as disabled by a target predicate value stored in a predicate register. In some implementations the target predicate value could be a value stored in a predicate register identified by a register specifier in the encoding of the predicated vector instruction. Alternatively some implementations may only provide one predicate register and so the target predicate value need not be explicitly referenced in the instruction encoding. The predicate value can be used to mask off lanes which are not required because they represent conditional operations for which a condition determined based on an outcome of an earlier instruction has failed, or for handling loop unrolling, for example. Predicated vector instructions are typically handled by performing a lookup for checking the current value of the target predicate value at the execute stage. Hence, in response to the predicated vector instruction one or more micro-operations may be issued to the execute stage, each triggering the execute stage to look up a corresponding part of the target predicate value and determine whether the effect of a corresponding lane of processing is to be masked or not.

However, in practice some predicated vector instructions may have a number of lanes disabled by the target predicate value. In some cases, all of the lanes of a given predicated vector instruction may be disabled. This is particularly common when predication is used for loop unrolling. Loop unrolling is a technique where a program loop is replaced with a longer loop of instructions with fewer iterations of the loop, to reduce the overhead of controlling program flow around the loop (which tends to scale with the number of loop iterations). When loop unrolling is performed by a compiler, this leads to sequences of instructions within the loop body which act on different inputs corresponding to different iterations of the original loop being unrolled, and so full sequences of instructions may be disabled by predication.

Hence, the approach discussed above for looking up the predicate value at the execute stage may result in a significant number of micro-operations being issued to the execute stage which in fact do not need to be executed at all, or could be handled more efficiently by an alternative sequence of micro-operations. Such micro-operations occupy resources in the back end of the pipeline (e.g. in the issue queue or execute stage), preventing other operations using the resources, which reduces performance. Also, the unnecessary micro-operations may cause delays to the execution of other micro-operations, because their register dependencies may delay issuing of either the predicated micro-operation or a subsequent micro-operation.

Instead, the at least one front end stage of the pipeline may comprise a predetermined front end stage which performs an early predicate lookup of the target predicate value, and in dependence on the early predicate lookup, varies which micro-operations are issued to the execute stage in response to the predicated vector instruction. Hence, the particular micro-operations issued for a given predicated vector instruction can be adapted based on information about the current status of the predicate value, to reduce the likelihood that unnecessary micro-operations are issued to the execute stage. The variation in micro-operations could be done by omitting or replacing at least one micro-operation which would otherwise be issued in response to the predicated vector instruction.

This approach is counterintuitive since one may expect that it would be expensive to read the predicate registers at an early stage of the pipeline, and also the possibility of intervening writes to the predicate register occurring between the stage of the pipeline at which the early predicate lookup is performed and the execute stage could complicate the early predicate lookup circuitry. However, in practice the inventors recognised that the performance gains (from saving resources in later pipeline stages by varying the composition of micro-operations issued for a predicated vector instruction to reduce the chance of micro-operations being executed which are entirely disabled by the predicate) outweigh the cost of implementing the early predicate lookup and guarding against cases when an intervening write changes the state of the predicate register after the early predicate lookup has been performed.

In some implementations it is possible for the early predicate lookup to be performed by the predetermined front end stage by referencing the actual predicate registers which are also accessed by the execute stage for predicated micro-operations. However, in practice this may require relatively long wires to route the predicate values from the predicate registers to the predetermined front end stage, which could make efficient circuit implementation of the pipeline more difficult. Also, in practice, the actual predicate values themselves may contain more information than is really needed for determining whether it is possible to vary the micro-operations issued to the execute stage in response to a given predicate vector instruction, and so the overhead associated with routing each of the bits of each predicate value to the predetermined front end stage may be unjustified.

Instead, the predetermined front end stage may perform the early predicate lookup with reference to predicate tracking information which is stored in a predicate lookup buffer separate from the at least one predicate register. Although in some cases the predicate lookup buffer could simply store a copy of the predicate values from the at least one predicate register, the circuit area and power consumption associated with the predicate lookup buffer can be reduced if the predicate tracking information provides a summary of the at least one predicate value stored in the at least one predicate register. For example, the predicate tracking information could summarise the at least one predicate value such that it may not precisely track each lane indicated by the predicate value separately, but could provide status flags shared between lanes to track whether all of the lanes in a given portion of the predicate value are marked as disabled. Also, the summary could summarise the at least one predicate value such that it is not necessary for every predicate value to be tracked in the predicate tracking information. Some implementations could provide predicate tracking information for just a subset of the predicate registers, for example using a least recently used eviction policy with a cache-like storage structure to store the predicate tracking information for a number of recently accessed predicate registers.

In one example the predicate tracking information may comprise at least one status flag indicative of whether all lanes within a corresponding subset of the two or more lanes to be performed for the predicated vector instruction are indicated as disabled by the predicate value stored in a corresponding predicate register. For example, if any one of the subset of lanes is not indicated as disabled by the predicate value, the corresponding status flag may have a first value and if all of the lanes are marked as disabled then the corresponding flag for that subset of lanes may have a second value. The early predicate lookup may determine, based on the value of the status flag, whether to vary the composition of the micro-operations issued in response to a vector predicate instruction.

In some examples, the subset of lanes corresponding to a given status flag may comprise all the lanes of processing, i.e. there is one status flag corresponding to a given predicate register. This approach can require less circuit area and power consumption overhead associated with updating the status flag for each predicate register and using the track information to determine how to vary the micro-operations issued. On the other hand, other implementations may provide multiple status flags per predicate register, with each status flag corresponding to a different subset of the two or more lanes. In this case, there is more precision in determining whether particular sets of lanes are all disabled, which can allow more resources to be saved by enabling more micro-operations to be replaced or omitted if possible. Hence, the precision with which the tracking information tracks whether subsets of lanes are disabled may vary from implementation to implementation to trade off performance against implementation cost.

Note that while the status flags are described as corresponding to subsets of lanes as discussed above, the number of lanes in the subset corresponding to a given status flag can be variable from instruction to instruction. Some pipelines may support different vector instructions specifying different data element sizes and hence a lane of processing may correspond to different size portions of a vector predicate register depending on the current element size for the current instruction. Hence, the subsets of lanes as discussed above could also be viewed as mapping to subsets of the register capacity within a given register. A given status flag could correspond to a certain number of predicate bits in the predicate value, which could map to one lane or multiple lanes depending on the current element size for the vector instruction which accesses the predicate value. Hence, the status flag may indicate whether all lanes in the subset of lanes corresponding to a given set of predicate bits are disabled, regardless of how many lanes are actually performed for that subset of lanes.

The status flags of the tracking information may be updated at various points of the pipeline. For example, the update to the status flags may occur at the predetermined front end stage, at the execute stage or at a commit stage for writing committed results of executed instructions to a register file. An update to the status flag could also be triggered by detection of a given event at one stage of the pipeline (e.g. the commit or execute stage) which may lead to a signal being transmitted to another stage of the pipeline (e.g. the predetermined front end stage) which actually updates the status flags. Hence, in general the pipeline as a whole may control setting of the tracking information—it is not essential for this to be done at any particular stage.

In response to a predicate-setting micro-operation writing a value to a destination predicate register indicating that all lanes within a given subset of the lanes are disabled the processing pipeline may set a given status flag corresponding to the given subset of lanes of the destination predicate register to indicate that all the lanes of that subset are disabled. This setting of the given status flag may be prevented if a predicate-setting instruction or another predicate-setting micro-operation for triggering a write to the destination predicate register is pending between the predicate-setting micro-operation and a next instruction or micro-operation to be processed at the predetermined front end stage. For example, counters may be maintained for tracking the number of pending predicate-setting micro-operations or instructions targeting a given predicate register, and the setting of the given status flag to indicate that the corresponding subset of lanes is disabled may be prevented if the relevant counter indicates that there is at least one intervening predicate setting operation pending.

Similarly, when a predicate-setting instruction or micro-operation for triggering a write to a target predicate register is detected at the predetermined front end stage, the processing pipeline may clear any indication that lanes are disabled for each status flag that corresponds to that target predicate register. Hence, regardless of whether the predicate setting instruction or micro-operation would actually result in any lanes becoming enabled, the corresponding status flags for the target predicate register of the predicate setting instruction or micro-operation are cleared anyway. This prevents speculative omission or replacement of predicated micro-operations which may turn out to be incorrect if an intervening predicate setting instruction or micro-operation were to change the target predicate register. If there is a risk that a predicate setting instruction or predicate setting micro-operation could update the target predicate register so it no longer indicates all the relevant subset of lanes as disabled, then the at least one status flag for the target predicate register is cleared and so subsequent predicated vector instructions would no longer have micro-operations omitted or replaced relative to the normal approach for processing predicated vector instructions in cases when all the lanes are enabled. This ensures that the processing outcome will be correct regardless of the fate of the subsequent predicate setting micro-operation issued to the execute stage.

The predicate lookup buffer may comprise two or more sets of predicate tracking information corresponding to different data element sizes. Each set of predicate tracking information may comprise one or more status flags as discussed above, with each status flag indicating whether a corresponding subset of processing lanes associated with processing of data elements of the corresponding data element size are all disabled. In response to the predicated vector instruction, the predetermined front end stage may perform the early predicate lookup of the target predicate value using the set of predicate tracking information corresponding to a current data element size specified by the predicated vector instruction.

When multiple element sizes are supported, each predicate value may include a series of predicate bits at the granularity of the minimum supported element size, and for instructions specifying a larger data element size, only a subset of those predicate bits would be referenced to determine whether to enable/disable the lanes of processing to be performed for that instruction. By providing multiple sets of predicate tracking information summarising whether lanes are enabled/disabled for the relevant data element size, this enables detection of cases when an instruction specifying a larger data element size has all lanes disabled even if there are other predicate bits for a smaller data element size enabled (but which are not relevant for the instruction specifying a larger data element size), so that the performance and energy efficiency savings associated with varying the micro-operation stream sent to the execute stage are available for more instructions.

In systems comprising two or more predicate registers the tracking information in the predicate lookup buffer may comprise information for tracking a predicate value stored by two or more of the predicate registers, not necessarily all of the predicate registers. However, some implementations may store tracking information for each predicate register.

In response to a context switch, the processing pipeline may flush the predicate lookup buffer of tracking information. Flushing the predicate lookup buffer may comprise resetting any status flags or other tracking information so that they no longer indicate any subset of lanes as disabled. Hence, following a context switch each vector lane may be assumed to be enabled until a predicate setting instruction or micro-operation is encountered which disables subsets of lanes. This avoids one context being affected by tracking information set in response to a different context.

Some processing pipelines may support execution of instructions of two or more threads of processing, with hardware registers being provided for concurrently storing context data for the two or more threads. This approach can be referred to as simultaneous multithreading (SMT). By allowing multiple threads to have instructions in flight in the pipeline simultaneously, this means that while one thread's instructions are stalled awaiting data to be loaded from memory for example, other instructions from other threads can make progress. SMT also helps to improve performance by reducing the overhead of switching between different threads compared to software-controlled context switches (where the registers only store one set of context data from one thread at a time, and periodic exceptions are required to trigger the context data from one thread to be saved to memory and context for another thread loaded to the registers from memory to allow continued execution of instructions from the new thread). In a pipeline supporting SMT, the predicate lookup buffer may store separate predicate tracking information for each of the two or more threads being processed concurrently. For example, the predicate lookup storage could include a number of entirely separate buffers each corresponding to one of the threads, or alternatively could comprise a common storage unit with each entry of the lookup buffer tagged with the identifier of the corresponding thread, so that the relevant thread's predicate tracking information could be looked up when a predicated vector instruction is encountered for that thread.

The predetermined front end stage could be any stage of the pipeline which is earlier than the execute stage. In one example the predetermined front end stage could be a decode stage for decoding program instructions to generate the micro-operations to be executed by the execute stage. In another example the predetermined front end stage could be a register renaming stage for mapping architectural register specifiers specified by program instructions or micro-operations to physical register specifiers identifying hardware registers of the data processing apparatus.

There are different ways in which the predetermined front end stage can vary which micro-operations are issued to the execute stage in response to the predicated vector instruction. For example, when the early predicate lookup identifies that at least one of the lanes of processing for the predicated vector instruction is disabled, the predetermined front end stage could omit at least one micro-operation corresponding to the predicated vector instruction. This could be useful for forms of the instruction which use merging predication, in which portions of a result vector corresponding to disable lanes are to retain a value of a corresponding portion of a destination register used for storing the result vector. As the destination register is to remain unchanged for the portion corresponding to the disabled subset of lanes, omitting the corresponding micro-operation may still allow the correct result to be generated in response to the predicated vector instruction. Hence, by omitting the micro-operation which generates the result for a given part of the destination register, this reduces the number of micro-operations which have to be handled by the execute stage (and possibly other stages of the pipeline as well) saving micro-operation slots which can be used for other micro-operations to improve performance.

Also, the micro-operations issued to the execute stage can be varied by replacing at least one micro-operation corresponding to the predicated vector instruction with an unpredicated micro-operation to be processed independently of the target predicate value by the execute stage. For example, some predicated vector instructions may use zeroing or clearing predication where portions of a result vector corresponding to disabled lanes are to be cleared to a predetermined value, such as zero. In this case a write to the destination register may still be required, but the write does not need to be dependent on the predicate register (or on other input operands of the predicated vector instruction), as it is already known from the early predicate lookup that portions of the result corresponding to the disabled lane should be set to the fixed predetermined value. For example a predicated micro-operation can be replaced with an unpredicated move micro-operation which writes the predetermined value to a portion of the destination register. In some cases, replacing micro-operations can reduce the number of micro-operations which need to be processed in response to the predicated vector instruction. For example, a number of separate micro-operations each corresponding to a given lane can be replaced with a single unpredicated micro-operation for writing zero or another predetermined value to at least a portion of the destination register. However, even if the replacement does not actually reduce the number of micro-operations issued, it can still help to improve performance because the replaced micro-operations do not read from their input operands or the target predicate registers, and so there are fewer dependencies between micro-operations, which can reduce the change that micro-operations are delayed while waiting for a result of an earlier micro-operation.

In some cases, vector instructions with merging predication could also be handled by replacement of micro-operations rather than omission. For example, even though a portion of a destination register is to remain the same, if register renaming is used (particularly for out-of-order processors), with some register renaming schemes this may still require the old value of the destination architectural register to be transferred to a new physical register. Hence, even for merging predicated vector instructions, at least one micro-operation could be replaced with a move micro-operation which moves the old value of the destination register to the new physical register.

Figure 1:
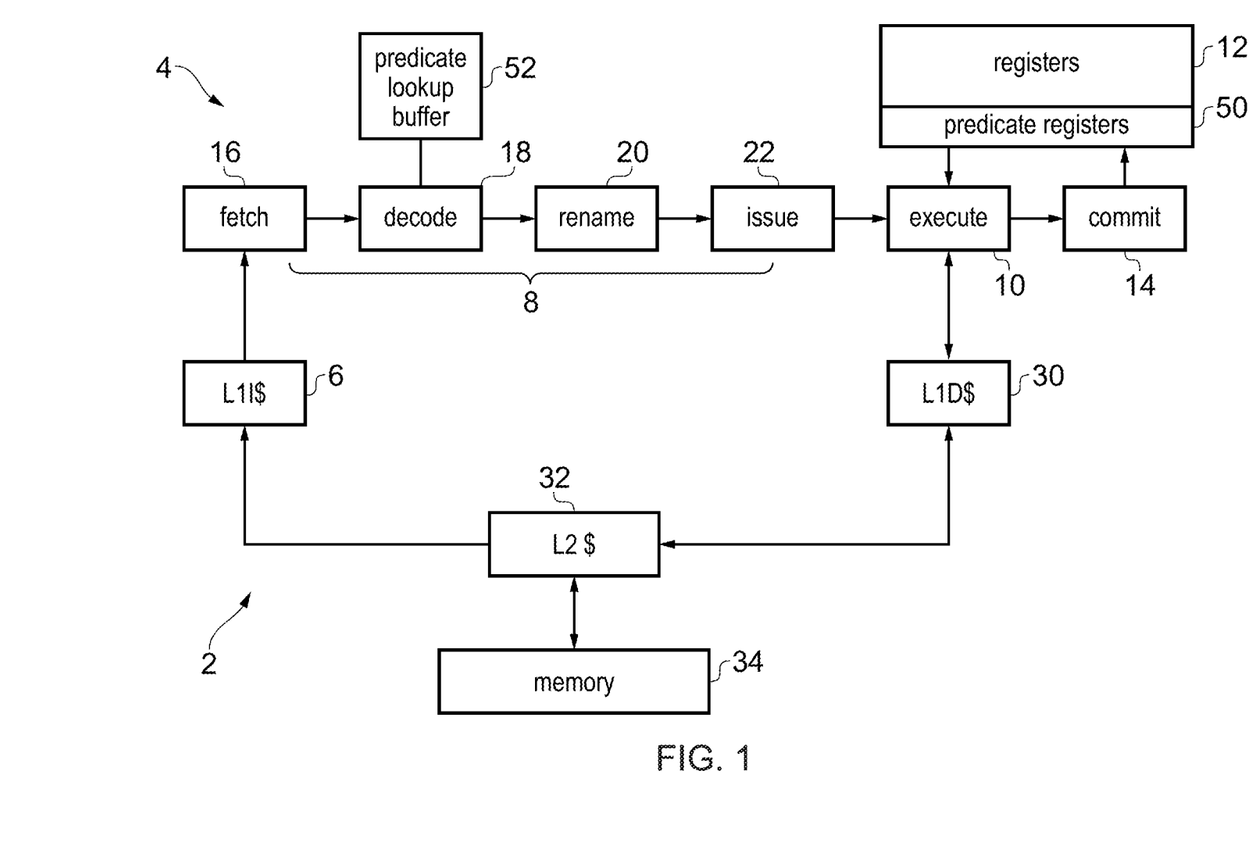
FIG. 1 schematically illustrates an example of a data processing apparatus.

FIG. 1 schematically illustrates an example of a data processing apparatus 2 having a processing pipeline 4 for performing data processing operations in response to program instructions fetched from an instruction cache 6. The pipeline 4 includes a front end portion 8 for fetching the program instructions to be executed and preparing corresponding micro-operations to be executed by an execute stage 10. In response to the micro-operations, the execute stage 10 performs corresponding data processing operations to generate results which are committed to registers 12 at a commit stage 14.

In this example, the front end portion 8 includes a number of pipeline stages including a fetch stage 16, a decode stage 18, a rename stage 20, and an issue stage 22. The fetch stage 16 fetches program instructions to be executed from the instruction cache 6. The fetch stage 16 may include a branch predictor for predicting outcomes of branch instructions in order to track non-sequential program flow, to generate a series of fetch addresses of instructions to be executed. The instructions that are fetched by the fetch stage are passed to the decode stage 18, which decodes the instructions to map them to micro-operations to be passed to remaining stages of the pipeline 4. Some program instructions may map to a single micro-operation, while others may map to multiple micro-operations. The decoded micro-operations are passed to the rename stage 20 which renames architectural registers specified by the micro-operations to physical register specifiers identifying hardware registers of the physical register file 12. Register renaming is useful especially in out-of-order processors for avoiding false register dependencies by mapping architectural register specifiers onto a larger physical register file 12.

The renamed micro-operations are passed to an issue stage 22 which queues the micro-operations while awaiting execution, until their required input operands are available. The execute stage 10 may include a number of separate execution pipelines or functional units corresponding to different types of operations to be executed. For example, the execute pipelines could include at least one integer pipeline for executing arithmetic or logical operations on integer operands, at least one floating-point pipeline for executing arithmetic or logical operations on floating-point operands, a load/store pipeline for handling load operations for transferring data from a memory system to the registers 12 or store operations for storing data from the registers 12 to the memory system, and so on. In this example, the memory system includes the instruction cache 6, a level one data cache 30, a level two cache 32 shared for instructions and data, and main memory 34. It will be appreciated that this is just one example of a possible cache hierarchy and other implementations may use difference numbers of caches and different numbers of levels of caches.

A micro-operation may be issued to the execute stage 10 when there is a free slot in the relevant execution pipeline capable of processing that micro-operation, and any required operands for the micro-operation are available. In an in-order processor, issue of a micro-operation may also require any micro-operation associated with an earlier instruction in the program order to have issued. For an out-of-order processor, a given micro-operation can issue when there is a free slot in the execute pipeline and the operands are available, regardless of whether all earlier micro-operations have been issued. If the data processing apparatus 2 supports out-of-order execution, the commit stage 14 may for example include a re-order buffer for tracking out-of-order completion of executed instructions relative to the original program order corresponding to the instruction addresses in memory. Other implementations may use in-order execution and in this case the commit stage 14 may simply write back results of executed instructions in order, and also the rename stage 20 may not be required.

Some implementations may support processing of only a single thread of instructions at a time. However, other implementations could support simultaneous multi-threading where instructions from two or more threads are in flight in the pipeline simultaneously and multiple sets of hardware registers are used for storing the respective sets of context data for each of the threads. In this case, the instructions and micro-operations passing down the pipeline may be tagged with an identifier of the corresponding thread, so that it is known which set of registers 12 to look up.

Figure 2:
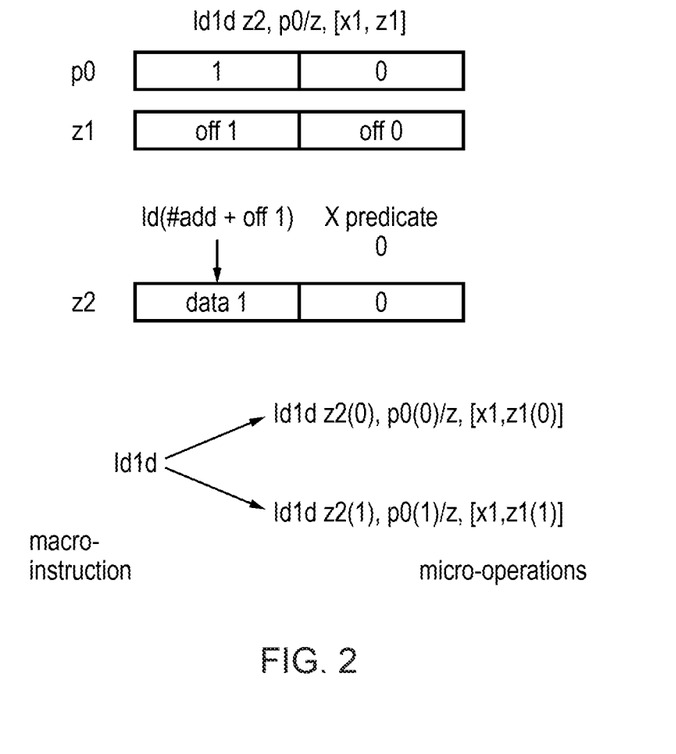
FIG. 2 shows an example of a predicated vector instruction.

As shown in FIG. 1, the registers 12 may include a set of predicate registers 50 which are used for controlling the operations of predicated vector instructions. FIG. 2 shows an example of a predicated vector instruction which in this example triggers processing of two lanes of processing, but it will be appreciated that other vector instructions could trigger different numbers of lanes. In this example, the predicated vector instruction is a load instruction for which each lane of processing comprises loading of a value from an address determined by adding an offset off0, off1 read from a corresponding lane of an input register z1 to a base address #add stored in a scalar register x1, with the loaded value being placed in a corresponding portion of a destination vector registers z2. A predicate value in a target predicate register p0 specified by the instruction includes a series of predicate bits. A given lane of vector processing may correspond to one predicate bit, or multiple predicate bits (if the data element size for one lane is larger than the minimum data element size supported by the pipeline). If the predicate bits for a given lane are equal to 1, then the corresponding lane of processing is enabled and so the corresponding part of the destination register z2 is updated based on the value loaded from the required address. For lanes where the predicate bit is 0 the operation of the corresponding lane of processing is masked and so the corresponding part of the destination register takes a value which is independent of the lane of processing.

For load/store operations, masking of a lane of processing could be carried out by preventing a memory access request for that lane being issued to memory, to save memory bandwidth. However, it is also possible to use predication for arithmetic or logical instructions, in which case masking of a lane of processing could be implemented either by stopping the arithmetic/logical operation being performed at all, or by performing the arithmetic/logical operation for a disabled lane but preventing the result of the operation being written to a portion of the destination register corresponding to a disabled lane.

FIG. 2 shows an example of a zeroing (clearing) predication, where the disabled lanes have the corresponding parts at the destination register set to zero. It is also possible to provide clearing modes of predication where the disabled parts of the destination register are set to a predetermined value other than zero. Also, a merging predication is possible where the disabled lanes have the corresponding parts of the destination register retaining their previous value that was stored in the destination register prior to executing the instruction. The particular predication mode to be used can be specified by the predicated vector instruction.

As shown at the bottom of FIG. 2, one approach for handling such predicated vector instructions may be to map the program instruction to a number of separate micro-operations which each correspond to one of the lanes of processing, with each individual micro-operation being predicated based on a corresponding part of the target predicate register p0. However, this decomposition of the instruction into separate micro-operations is not essential and other approaches could handle processing of a micro instruction which corresponds to multiple lanes, each predicated based on a respective part of the predicate value. In any case, regardless of exactly how the predicated vector instruction is mapped to micro-operations encountered by the execute stage, the conventional approach to executing such micro-operations would be to lookup the relevant parts of the predicate register p0 at the execute stage 10. However, if it turns out that a given micro-operation is not required because the corresponding part of the predicate register is disabled, then this micro-operation has taken up an unnecessary execution slot and could also have taken up slots in earlier stages such as the rename stage 20 or the issue stage 22, which could otherwise have been used for other micro-operations. Also, the unnecessary micro-operation could have a knock on effect on performance because of dependencies between micro-operations. For example, the micro-operation may be deferred until the source register z1 or the previous value for the destination register z2 is available, but if it is known already that the entire register should be set to the fixed value of zero because all lanes are disabled then this could be avoided, and other instructions requiring the outcome of the predicated operation may be able to be processed sooner.

Figure 3:
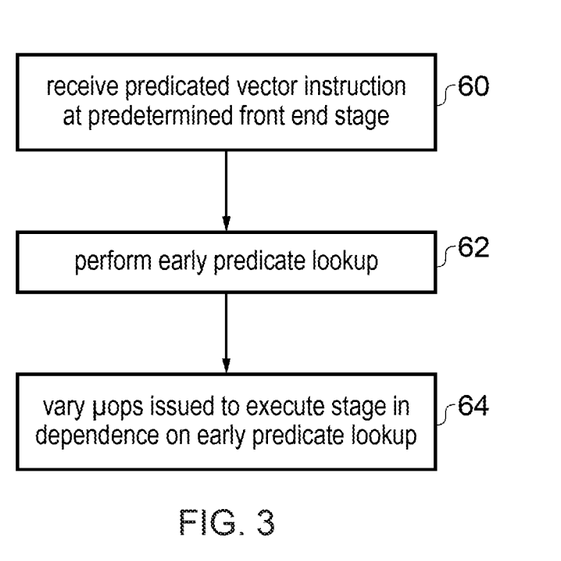
FIG. 3 is a flow diagram illustrating a method of performing an early predicate lookup for a predicated vector instruction.

As shown in FIG. 3, an early predicate lookup can be performed at a predetermined front end stage within the front end portion 8 of the pipeline. In the example of FIG. 1 the predetermined front end stage is the decode stage 18, but it could also be other stages such as the rename stage 20 or issue stage 22. At step 60 the predetermined front end stage 18 receives a predicated vector instruction (or a series of micro-operations corresponding to a predicated vector instruction—e.g. if the predetermined front end stage is the rename or issue stage). At step 62 the predetermined front end stage 18 performs an early predicate lookup to check a current status of the predicate register 50 required by the predicated vector instruction. While this early predicate lookup could be based on the predicate registers 50 themselves, it can be more efficient to access a separate predicate lookup buffer 52 which is located nearer to the predetermined front end stage 18 which is performing the early predicate lookup. The predicate lookup buffer 52 need not track the contents of the predicate registers 50 precisely, but could merely summarise the contents of the predicate registers. Based on the early predicate lookup, at step 64 the predetermined front end stage 18 varies the micro-operations that are issued down the pipeline for the predicated vector instruction.

Figure 4:
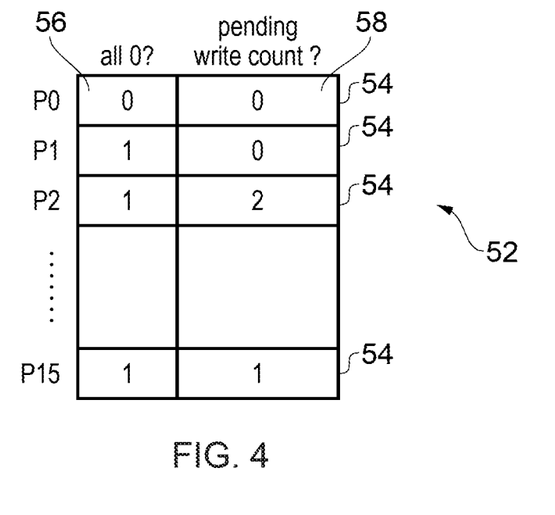
FIGS. 4 to 6 show different example implementations of a predicate lookup buffer for storing predicate tracking information.

FIG. 4 shows a first example of a possible implementation for the predicate lookup buffer 52. In this example the lookup buffer includes a number of entries 54 each corresponding to one of the predicate registers 50. Each entry includes a status flag 56 specifying whether all of the lanes of processing are marked as disabled in the corresponding predicate register 50 (e.g. whether all of the bits of the corresponding predicate register are zero). For example, a value of 0 in a given predicate register status flag 56 may indicate that all of the lanes in the corresponding predicate register are 0 and a value of 1 may indicate that at least one lane in the corresponding predicate register is 1.

Also, each entry 54 may include a pending write count 58 for tracking the number of pending instructions or micro-operations which lie between the predetermined front end stage 18 and the execute stage 10 which could still update the corresponding predicate register. When a pending predicate register write is encountered at the predetermined front end stage 18, the write count 58 for the specified predicate register is incremented. When a write to a given predicate register is performed at the execute or commit stage, the write counter 58 is decremented. Hence, when the counter 58 is non-zero then there is at least one pending predicate register write between the predetermined front end stage 18 and the point of the pipeline at which the register write takes place. It will be appreciated that this is just one way in which intervening predicate register writes could be tracked, and other implementations are possible. In general, tracking intervening predicate register writes can be useful for tracking whether, when a given pending micro-operation clears all the bits of a predicate register to disable all lanes, it is safe to also clear the corresponding status flag 56.

In practice, while there may be some predicate registers which are written often, for example based on the outcome of conditional instructions, other predicate registers may keep the same value for a relatively long time and so for those registers the use of the predicate status flag 56 can be particularly useful since once they are set to zero to disable all lanes then it is relatively unlikely that another instruction will then enable lanes again.

Figure 5:
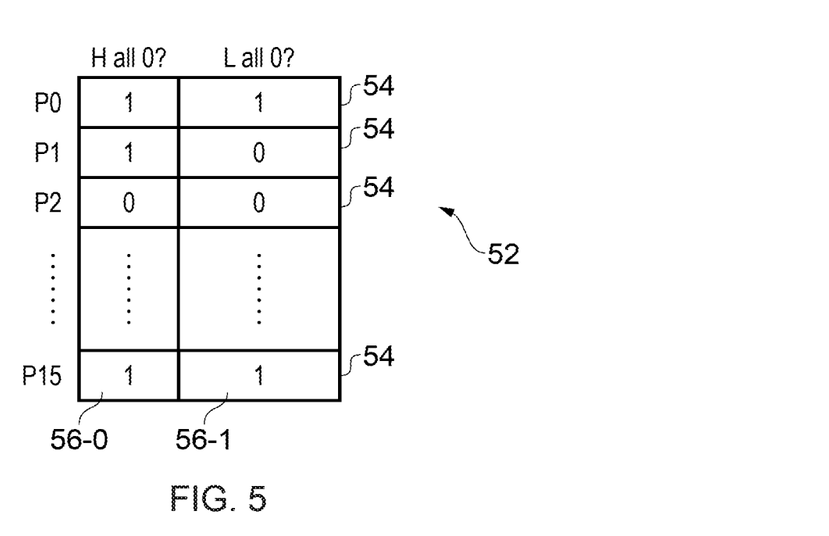

As shown in FIG. 5, in another example 52 the entries of the predicate lookup buffer 52 may track disabling of lanes more precisely for different subsets of lanes within the corresponding predicate register. For example, in FIG. 5 each entry 54 includes a first status flag 56-0 and a second status flag 56-1 which correspond to the upper and lower halves of the corresponding predicate register respectively. Each flag 56 indicates whether the corresponding subset of lanes are all indicated as disabled by the corresponding predicate register. This enables the predetermined front end stage 18 to make decisions on whether to issue particular micro-operations at a finer granularity, which can enable performance improvements by allowing micro-operations to be replaced or omitted more often even if not all lanes are disabled by the predicate value. While FIG. 5 shows a case where each subsets of lanes corresponds to half the lanes, other examples could provide four flags per predicate register to track the lanes in each quarter of the predicate register, or a different number of status flags. In practice, the number of status flags provided per predicate register may be a trade-off between circuit overhead in updating and checking the status flags, and the performance gain expected from enabling more informed decisions on how to vary the composition of the micro-operations issued for a given predicated vector instruction. While not shown in FIG. 5, this approach could also provide a write counter 58 for each entry similar to the one shown in FIG. 4.

Figure 6:
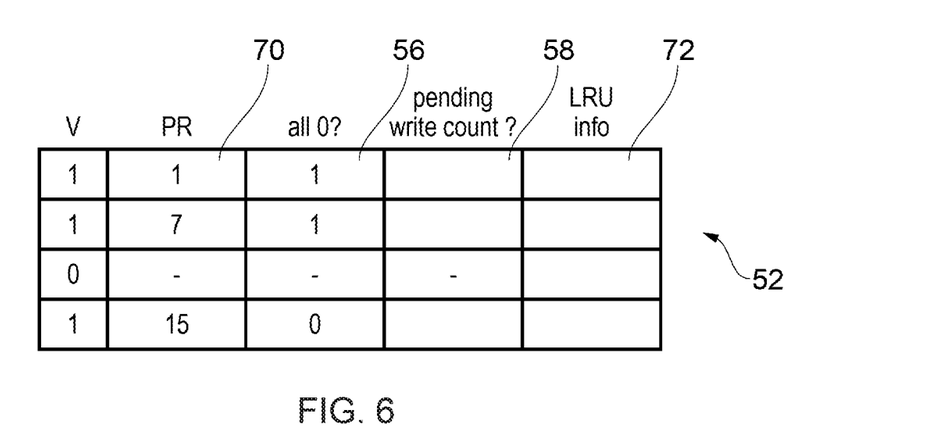

FIG. 6 shows another potential implementation of the predicate lookup buffer 52. In this case rather than entries 54 each having a fixed mapping to a given predicate register, the predicate lookup buffer could have a cache-like structure where a number of entries are available for allocation to particular predicate registers as identified by a predicate register field 70 of the entry. Each entry comprises a valid bit V which indicates whether the contents of that entry are valid. At least one status flag 56 similar to the flags of FIG. 4 or 5 discussed above may be provided in each entry to indicate whether at least a subset of the lanes are marked as disabled by the corresponding predicate register. Again a pending write count 58 may be included in each entry. In the cache embodiment an additional field 72 may for example provide least recently used information for identifying which entry has least recently been accessed, for making decisions on which entry to evict if a new entry has to be allocated for a predicate register which does not currently have a valid entry in the predicate lookup buffer 52.

Another potential implementation for the predicate lookup buffer 52 could be to simply store a list of the predicate register numbers for which all lanes are currently disabled, with no information being stored at all for predicate registers for which at least one lane is enabled in the predicate register. A given predicate register identifier could then be added or removed from the list as required when micro-operations set or clear the corresponding predicate registers.

Figure 7:
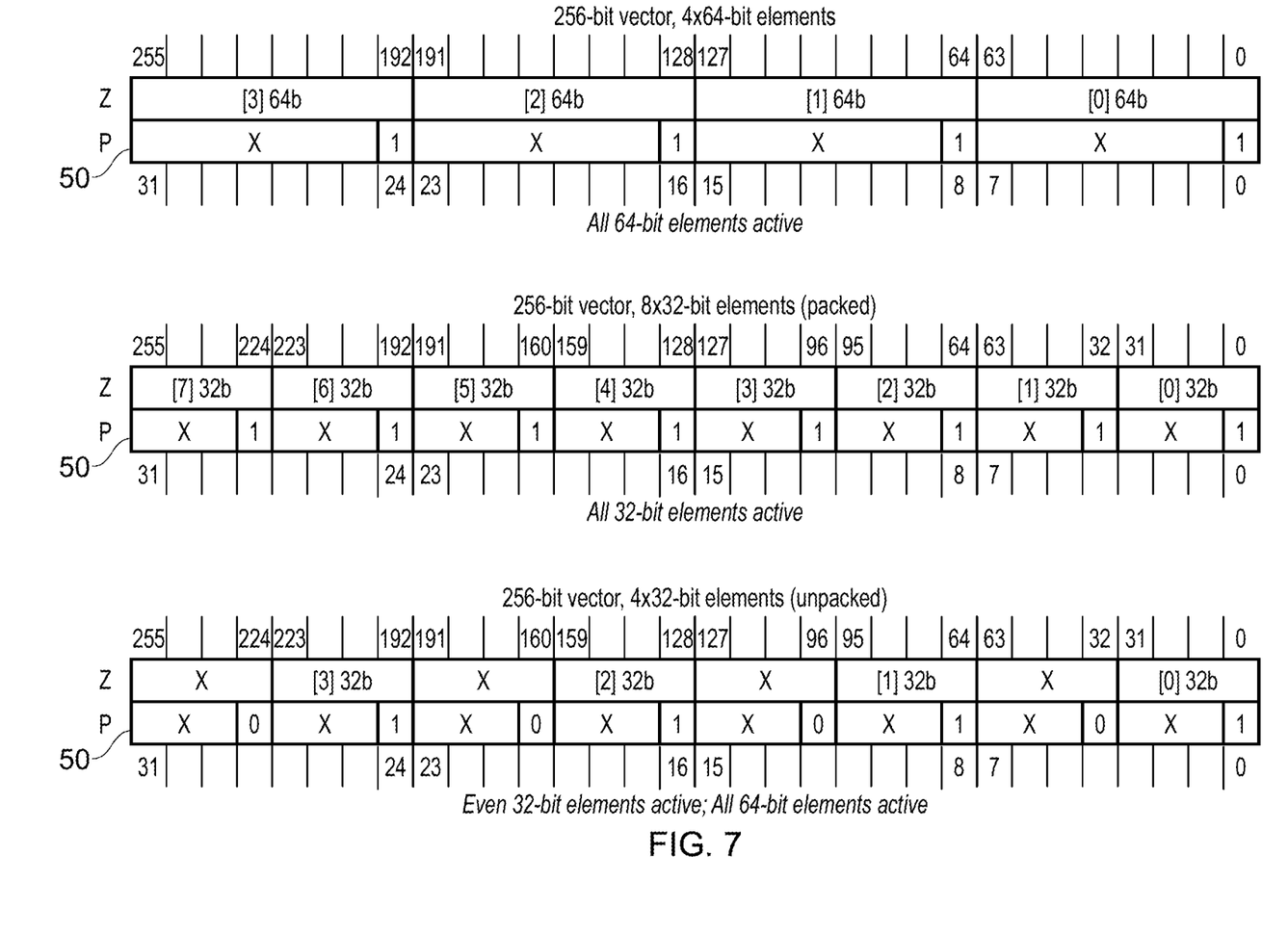
FIG. 7 shows an example of different data element sizes for a vector.

As shown in FIG. 7, a vector register can be divided into data elements of multiple sizes supported by the processing pipeline 4. For example, a 256-bit vector register could be divided into 8-bit, 16-bit, 32-bit or 64-bit data elements (1-byte, 2-byte, 4-byte or 8-byte). The predicate registers 50 may include one bit per element of the smallest supported data type. In the example of FIG. 7 the smallest data element size is one byte, so 32 predicate bits are provided for the 256-bit vector register, and if a given instruction specifies a current element size of 8 bytes to be used in each lane of processing, then one bit out of every eight is used by the instruction to determine if that 8-byte element (lane) is disabled (see the top example of FIG. 7). If the current data element size is 4 bytes, then one predicate bit out of every four would be used for that instruction to determine if a given element is disabled (see the lower two examples of FIG. 7).

In some examples, as shown in FIGS. 4 to 6 above, one predicate lookup flag could indicate whether all elements (or all of a subset of elements) of the smallest data element size are disabled. This can simplify the storage requirements for the predicate lookup buffer. However, in this case there is a chance that even if all the predicate bits for a larger data element size (e.g. bits 0, 8, 16, 24 for 64-bit elements in the FIG. 7 example) are 0, a corresponding vector instruction specifying the larger data element size may be assumed to include some enabled lanes if one of the other predicate bits is 1, because the predicate tracking information may not distinguish the predicate bits relevant to each data element size.

Figure 8:
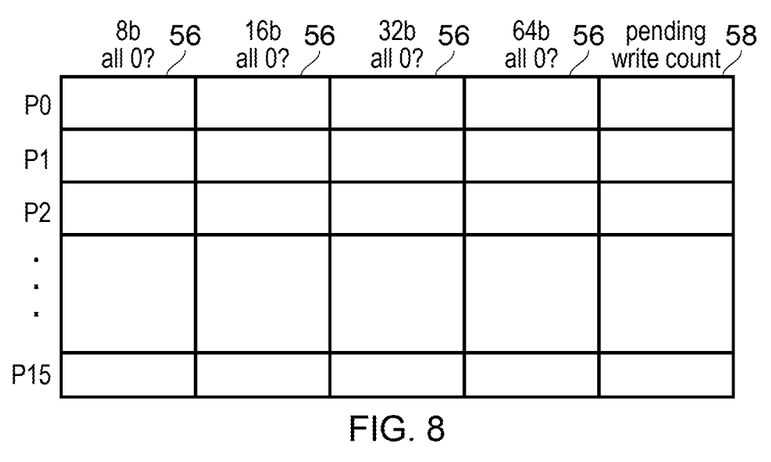
FIG. 8 shows an example of maintaining multiple sets of predicate tracking information for different data element sizes.

As shown in FIG. 8, another embodiment could provide separate sets of predicate tracking information for each data element size supported (in addition to any other information maintained per predicate register, such as the pending write count 58 or LRU information 72, etc.—this additional information need not be duplicated per data element size). Each set of predicate tracking information may include one status flag 56 for that data element size (in the example of FIG. 8), or could have two or more status flags 56 per data element size, for different subsets of lanes at that data element size (if the example shown in FIG. 5 is expanded to handle multiple data element sizes). For example, with FIG. 5 providing 2 subsets of predicate bits per predicate register, multiplying for 4 data element sizes would give 8 predicate lookup status flags 56 per predicate register.

When a given vector instruction reaches the predetermined front end stage 18, the set of predicate tracking information corresponding to the current data element size of the instruction is used to determine whether all the lanes relevant to that data element size are disabled, or in the FIG. 5 whether all of a given subset of lanes at that data element size are disabled. This approach allows instructions specifying a larger data element size to benefit from the power/performance savings of varying the micro-operation stream as discussed above, even if some of the other predicate bits for smaller data element sizes (which are not relevant for a larger element size instruction) are still enabled. While FIG. 8 shows an example based on the approach shown in FIG. 4, it is also possible to extend the approaches shown in FIGS. 5 and 6 to provide multiple sets of status flags 56 for different data element sizes.

Hence, there are a range of possible implementations for the predicate lookup buffer, but in general they provide a way of identifying at an early stage of the pipeline whether a given subset of lanes (or possibly all of the lanes) are marked as disabled by a given predicate register. If it is not known that all lanes in a given subset of lanes are disabled, then the normal sequence of micro-operations for the predicated vector instruction can be issued to the execute stage 10, which are predicated by looking up the predicate register at the execute stage 10. However, when it is known from the early predicate lookup that all the lanes in the given subset are disabled, then some micro-operations can be omitted or replaced with an alternative form of micro-operation such as an unpredicated micro-operation.

Figure 9:
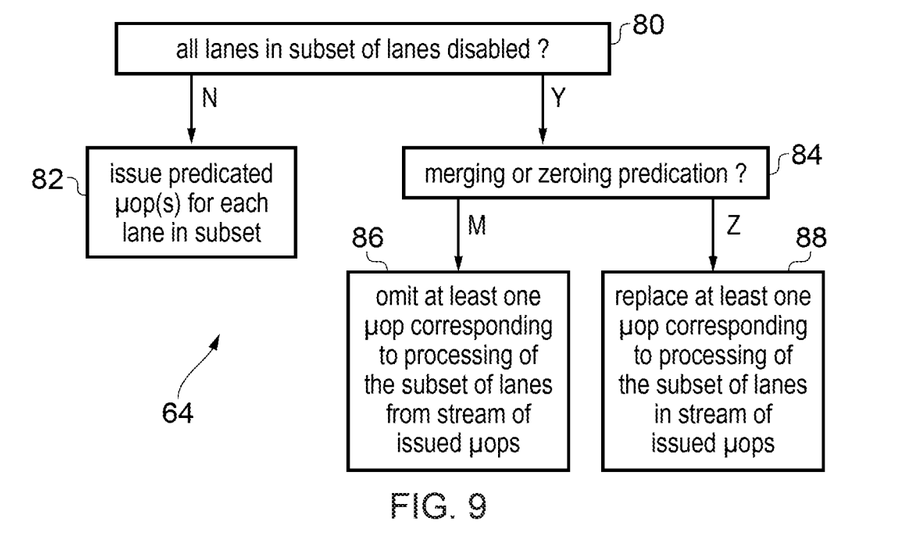
FIG. 9 is a flow diagram showing a method of varying which micro-operations are issued to an execute stage in dependence on an early predicate lookup.

FIG. 9 shows a flow diagram for controlling the issuing of micro-operations in dependence on the early predicate lookup, providing further detail on step 64 of FIG. 3. At step 80 the predetermined front end stage 18 determines whether all lanes in a given subset of lanes for the current vector instruction are disabled. If not, then at step 82 the predetermined front end stage controls the pipeline 4 such that one or more predicated micro-operations are issued to the execute stage for triggering the execute stage to perform each lane in the subset with reference to the corresponding part of the target predicate register. If it is determined that all lanes in a subset of lanes are disabled at step 80, then at step 84 it is determined whether the predicated vector instruction uses merging or zeroing predication. If merging predication is used then at step 86 at least one micro-operation corresponding to processing of a subset of lanes is omitted from the stream of issued micro-operations. Even though the micro-operation is omitted, there may still be a control signal issued to a subsequent stage such as a rename stage 20 for triggering an action such as changing register mappings between architectural and physical registers.

For vector instructions using zeroing predication, at step 88 at least one micro-operation corresponding to processing of the relevant subset of lanes is replaced in the stream of issued micro-operations. For example a micro-operation can be replaced with an unpredicated micro-operation which does not need to refer to the predicate registers, for example an unpredicated move micro-operation which writes zero to the destination register. In some implementations supporting register renaming, vector instructions using merging predication could also be handled according to step 88 instead of step 86. For example, for a non-destructive instruction for which the destination register is different to the source register, a micro-operation can be replaced with an unpredicated move micro-operation to move a value from one physical register to another physical register corresponding to a renaming of the destination architectural register.

The steps of FIG. 9 may be executed multiple times sequentially or in parallel for different subsets of lanes for the predicate vector instruction. Alternatively, in embodiments such as the one in FIG. 4 where there is only one status flag for the entire predicate register then all of the lanes may be considered to be part of the same subset and so the steps of FIG. 9 may be performed once for the entire instruction.

Figures 10, 11:
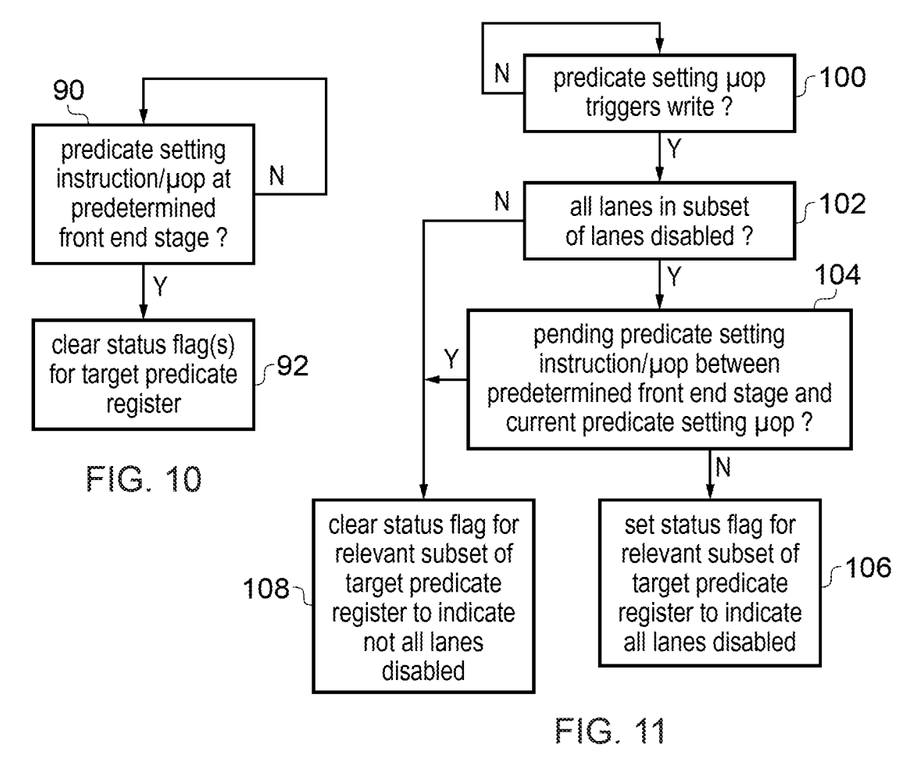
FIG. 10 is a flow diagram illustrating clearing of predicate status flags in response to a predicate setting instruction or micro-operation.
FIG. 11 is a flow diagram illustrating a method of controlling setting of predicate status flags in response to a predicate setting micro-operation at an execute stage.

FIGS. 10 and 11 show steps performed by the pipeline 4 (e.g. at the execute stage 10, predetermined front end stage 18 or commit stage 14) for controlling setting of the status flags in the predicate lookup buffer 52. As shown in FIG. 10, at step 90 the predetermined front end stage may determine whether it has encountered a predicate setting instruction or micro-operation which writes to a given target predicate register. When a predicate setting instruction or micro-operation is encountered at the predetermined front end stage, then at step 92 the predetermined front end stage clears the status flags for the target predicate register of that instruction or micro-operation, to ensure that they no longer indicate any subset of lanes as disabled. The pending write count 58 for the target predicate register may also be incremented. When an instruction or micro-operation is known to write to a predicate register then the corresponding flags in the predicate lookup buffer 52 are set to a given value (e.g. 1) to prevent speculative discarding or replacement of predicated micro-operations in case the current predicate setting instruction or micro-operation ends up re-enabling some lanes.

FIG. 11 shows steps for updating the predicate tracking information in response to a predicate setting micro-operation triggering a write of a target predicate register. When the predicate register write is detected at step 100, then at step 102 one of the pipeline stages determines whether the value written to the predicate register by that micro-operation indicates that all lanes are disabled. If so, then at step 104 it is detected whether there is a pending predicate setting instruction or micro-operation to be processed at the predetermined front end stage and the current predicate setting micro-operation triggering the predicate register write. For example this could be detected using the write counter 58 in the predicate lookup buffer. If there is no intervening predicate setting instruction then at step 106 the status flag for the relevant subset of lanes in the target predicate register is updated to indicate that all lanes are disabled. For example the corresponding status flag can be set to 0. If either the value written by the predicate setting micro-operation does not indicate all lanes that are disabled for the relevant subset of lanes at step 102, or there is at least one pending predicate setting instruction or micro-operation between the front end stage and the execute stage at step 104, then at step 108 the corresponding status flag for the relevant subset of lanes for the target predicate register is cleared to indicate that not all lanes are disabled. For example this may correspond to setting the corresponding status flag to 1. In response to the write to a target predicate register, the write counter 58 for the target predicate register may be decremented. Again, if the embodiment supports multiple status flags corresponding to different subsets of lanes of each predicate register then steps 102 to 108 may be performed multiple times in parallel or sequentially for each respective subset.

There may also be some other operations which lead to updating of the predicate lookup buffer contents. For example, on a context switch the predicate lookup buffer 52 may be flushed to ensure that vector instructions executed after the context switch are not inadvertently predicated based on predicate information which was actually associated with a different context. The flushing of the predicate lookup buffer 52 may reset all the flags to indicate that lanes are not disabled.

Alternatively, the predicate lookup buffer 52 could include a context identifier (e.g. address space identifier (ASID) or process identifier) of the context associated with the predicate lookup information. For example, in the cache-like example of FIG. 6, there could be an additional field for the context identifier. In this case, there may be no need to flush the predicate lookup buffer on a context switch, as predicate lookup information for multiple contexts can be retained.

In an SMT core, the predicate lookup buffer 52 may be duplicated per thread, or the entries of the predicate lookup buffer tagged with the thread identifier of the corresponding thread, to ensure that the correct threads information is looked up in response to an instruction from a given thread.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
  a processing pipeline comprising at least one front end stage responsive to program instructions to issue micro-operations for execution, and an execute stage to perform data processing in response to the micro-operations issued by said at least one front end stage; and
  at least one predicate register to store at least one vector predicate value;
  wherein in response to a predicated vector instruction for triggering execution of a plurality of lanes of processing in response to a single predicated vector instruction, said at least one front end stage is configured to issue at least one micro-operation corresponding to said predicated vector instruction and to control the execute stage to mask an effect of a lane of processing indicated as disabled by a target vector predicate value stored in one of said at least one predicate register, wherein said target vector predicate value comprises a plurality of elements, each element of said plurality of elements corresponding to a lane of the plurality of lanes of processing; and
  said at least one front end stage comprises a predetermined front end stage to perform an early predicate lookup of the target vector predicate value, and to vary, in dependence on the early predicate lookup, which micro-operations are issued to the execute stage in response to said predicated vector instruction, wherein the predetermined front end stage is configured to perform the early predicate lookup with reference to predicate tracking information stored in a predicate lookup buffer separate from said at least one predicate register, wherein the predicate lookup buffer is configured to store a plurality of sets of predicate tracking information corresponding to a plurality of different data element sizes, and wherein, in response to the predicated vector instruction, the predetermined front end stage is configured to perform the early predicate lookup of the target predicate value using the set of predicate tracking information corresponding to a current data element size specified by the predicated vector instruction.

2. The apparatus according to claim 1, wherein the predicate tracking information provides a summary of said at least one predicate value stored in said at least one predicate register.

3. The apparatus according to claim 1, wherein the predicate tracking information comprises at least one status flag indicative of whether all lanes within a corresponding subset of the plurality of lanes are indicated as disabled by the predicate value stored in a corresponding predicate register.

4. The apparatus according to claim 3, wherein the predicate tracking information comprises, for at least one of said at least one predicate register, a status flag indicative of whether all of the plurality of lanes of processing are indicated as disabled by the predicate value stored in that predicate register.

5. The apparatus according to claim 3, wherein the predicate tracking information comprises, for at least one of said at least one predicate register, a plurality of status flags each indicating whether a different subset of the plurality of lanes are indicated as disabled by the predicate value stored in that predicate register.

6. The apparatus according to claim 3, wherein in response to a predicate-setting micro-operation writing a value to a destination predicate register indicating that all lanes within a given subset of the plurality of lanes are disabled, the processing pipeline is configured to set a given status flag corresponding to said given subset of the plurality of lanes of said destination predicate register to indicate that all lanes of the given subset of the plurality of lanes are disabled.

7. The apparatus according to claim 6, wherein the processing pipeline is configured to prevent setting of said given status flag to indicate that the given subset of the plurality of lanes are disabled when a predicate-setting instruction or another predicate-setting micro-operation for triggering a write to said destination predicate register is pending between said predicate-setting micro-operation and a next instruction or micro-operation to be processed at the predetermined front end stage.

8. The apparatus according to claim 3, wherein in response to a predicate-setting instruction or predicate-setting micro-operation for triggering a write to a target predicate register being detected at the predetermined front end stage, the processing pipeline is configured to clear any indication that all lanes of said corresponding subset of lanes are disabled for each of said at least one status flag corresponding to said target predicate register.

9. The apparatus according to claim 1, comprising a plurality of said predicate registers, wherein the predicate tracking information comprises information for tracking a predicate value stored by two or more of said predicate registers.

10. The apparatus according to claim 1, wherein the processing pipeline is configured to flush the predicate lookup buffer in response to a context switch.

11. The apparatus according to claim 10, wherein the processing pipeline is configured to execute instructions of a plurality of threads of processing, the apparatus comprising hardware registers to concurrently store context data for the plurality of threads; and the predicate lookup buffer is configured to store separate predicate tracking information for said plurality of threads.

12. The apparatus according to claim 1, wherein said predetermined front end stage comprises a decode stage to decode program instructions to generate micro-operations for execution by the execute stage.

13. The apparatus according to claim 1, wherein said predetermined front end stage comprises a register renaming stage to map architectural register specifiers specified by program instructions or micro-operations to physical register specifiers identifying hardware registers of the apparatus.

14. The apparatus according to claim 1, wherein when the early predicate lookup identifies that at least one of the lanes of processing corresponding to the predicated vector instruction is disabled, the predetermined front end stage is configured to vary which micro-operations are issued to the execute stage in response to said predicated vector instruction by at least one of:

omitting at least one micro-operation corresponding to said predicated vector instruction; and replacing at least one micro-operation corresponding to said predicated vector instruction with an unpredicated micro-operation to be processed independently of the target predicate value by the execute stage.

15. The apparatus according to claim 1, wherein when the early predicate lookup identifies that all lanes in a subset of the lanes of processing corresponding to the predicated vector instruction are disabled, and the predicated vector instruction is a merging predicated vector instruction for which portions of a result vector corresponding to disabled lanes are to retain a value of a corresponding portion of a destination register for storing the result vector, the predetermined front end stage is configured to omit at least one micro-operation corresponding to processing of said subset of the lanes from a stream of micro-operations to be issued to the execute stage.

16. The apparatus according to claim 1, wherein when the early predicate lookup identifies that all lanes in a subset of the lanes of processing corresponding to the predicated vector instruction are disabled, and the predicated vector instruction is a clearing predicated vector instruction for which portions of a result vector corresponding to disabled lanes are to be cleared to a predetermined value, the predetermined front end stage is configured to replace at least one micro-operation corresponding to processing of said subset of the lanes with at least one unpredicated move micro-operation to write the predetermined value to at least a portion of a destination register of the predicated vector instruction.

17. The apparatus according to claim 1, wherein the predicate lookup buffer is configured to store a plurality of entries, each entry to provide predicate tracking information associated with a corresponding predicate register;

the entry of the predicate lookup buffer for a given predicate register comprises said plurality of sets of predicate tracking information corresponding to different data element sizes for the same predicate register; and the set of predicate tracking information for a given data element size and the given predicate register indicates whether bits of a predicate value stored in the given predicate register that are relevant to the given data element size indicate that all lanes in at least a subset of the plurality of lanes of processing are to be masked.

18. An apparatus comprising:

means for data processing comprising at least one front end stage means for issuing micro-operations for execution in response to program instructions, and execute stage means for performing data processing in response to the micro-operations issued by said at least one front end stage means; and at least one means for storing at least one vector predicate value;

wherein in response to a predicated vector instruction for triggering execution of a plurality of lanes of processing in response to a single predicated vector instruction, said at least one front end stage means is configured to issue at least one micro-operation corresponding to said predicated vector instruction and to control the execute stage means to mask an effect of a lane of processing indicated as disabled by a target vector predicate value stored in one of said at least one means for storing, wherein said target vector predicate value comprises a plurality of elements, each element of said plurality of elements corresponding to a lane of the plurality of lanes of processing; and said at least one front end stage means comprises a predetermined front end stage means to perform an early predicate lookup of the target vector predicate value, and to vary, in dependence on the early predicate lookup, which micro-operations are issued to the execute stage means in response to said predicated vector instruction, wherein the predetermined front end stage is configured to perform the early predicate lookup with reference to predicate tracking information stored in a predicate lookup buffer separate from said at least one predicate register, wherein the predicate lookup buffer is configured to store a plurality of sets of predicate tracking information corresponding to a plurality of different data element sizes, and wherein, in response to the predicated vector instruction, the predetermined front end stage is configured to perform the early predicate lookup of the target predicate value using the set of predicate tracking information corresponding to a current data element size specified by the predicated vector instruction.

19. A method for an apparatus comprising a processing pipeline comprising at least one front end stage responsive to program instructions to issue micro-operations for execution, and an execute stage to perform data processing in response to the micro-operations issued by said at least one front end stage; the method comprising:

receiving at said at least one front end stage a predicated vector instruction for triggering execution of a plurality of lanes of processing in response to a single predicated vector instruction, where an effect of a lane of processing indicated as disabled by a target vector predicate value is to be masked, wherein said target vector predicate value comprises a plurality of elements, each element of said plurality of elements corresponding to a lane of the plurality of lanes of processing;

performing an early predicate lookup of the target vector predicate value at a predetermined front end stage of said at least one front end stage; and varying, in dependence on the early predicate lookup, which micro-operations are issued to the execute stage in response to said predicated vector instruction, wherein the predetermined front end stage is configured to perform the early predicate lookup with reference to predicate tracking information stored in a predicate lookup buffer separate from said at least one predicate register, wherein the predicate lookup buffer is configured to store a plurality of sets of predicate tracking information corresponding to a plurality of different data element sizes, and wherein, in response to the predicated vector instruction, the predetermined front end stage is configured to perform the early predicate lookup of the target predicate value using the set of predicate tracking information corresponding to a current data element size specified by the predicated vector instruction.

* * * * *